United States Patent
Kim et al.

(10) Patent No.: US 10,451,150 B2
(45) Date of Patent: Oct. 22, 2019

(54) MULTI-STAGE TRANSMISSION FOR VEHICLE

(71) Applicants: Hyundai Motor Company, Seoul (KR); Kia Motors Corporation, Seoul (KR)

(72) Inventors: Ki Tae Kim, Incheon (KR); Seong Wook Hwang, Gyeonggi-do (KR); Hyun Sik Kwon, Seoul (KR); Won Min Cho, Gyeonggi-do (KR); Jae Chang Kook, Gyeonggi-do (KR); Seong Wook Ji, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 38 days.

(21) Appl. No.: 15/825,471

(22) Filed: Nov. 29, 2017

(65) Prior Publication Data

US 2019/0017574 A1    Jan. 17, 2019

(30) Foreign Application Priority Data

Jul. 12, 2017    (KR) .................. 10-2017-0088406

(51) Int. Cl.
    *F16H 3/66*    (2006.01)

(52) U.S. Cl.
    CPC .............. *F16H 3/66* (2013.01); *F16H 3/666* (2013.01); *F16H 2200/0069* (2013.01); *F16H 2200/2015* (2013.01); *F16H 2200/2046* (2013.01)

(58) Field of Classification Search
    None
    See application file for complete search history.

(56) References Cited

U.S. PATENT DOCUMENTS

| | | | | |
|---|---|---|---|---|
| 8,123,650 | B2 * | 2/2012 | Carey ...................... | F16H 3/66 475/282 |
| 8,360,924 | B2 * | 1/2013 | Kraynev ................. | F16H 3/663 475/277 |
| 8,403,802 | B2 * | 3/2013 | Wittkopp ................. | F16H 3/66 475/276 |
| 9,353,833 | B2 * | 5/2016 | Beck ....................... | F16H 3/66 |
| 9,587,714 | B2 | 3/2017 | Kook et al. | |
| 10,060,511 | B2 * | 8/2018 | Irving ..................... | F16H 3/66 |
| 10,072,735 | B2 * | 9/2018 | Crafton ................... | F16H 3/66 |
| 2018/0363737 | A1 * | 12/2018 | Kook ....................... | F16H 3/66 |
| 2019/0128388 | A1 * | 5/2019 | Hwang ................... | F16H 3/666 |

* cited by examiner

*Primary Examiner* — Dirk Wright

(74) *Attorney, Agent, or Firm* — Mintz Levin Cohn Ferris Glovsky and Popeo, P.C.; Peter F. Corless

(57) ABSTRACT

A multi-stage transmission for a vehicle is provided. The multi-stage transmission includes an input shaft, an output shaft, and first, second, third, fourth and fifth planetary gear devices that are disposed between the input shaft and the output shaft to transmit rotary force. Each of the first, second, third, fourth and fifth planetary gear devices have three rotary elements, and six shifting elements that are connected to the rotary elements of the first, second, third, fourth and fifth planetary gear devices.

10 Claims, 3 Drawing Sheets

FIG. 2

|      | B1 | B2 | CL1 | CL2 | CL3 | CL4 | GEAR RATIO |
|------|----|----|-----|-----|-----|-----|------------|
| 1ST  | ●  | ●  | ●   |     |     |     | 4.800      |
| 2ND  | ●  | ●  |     |     |     | ●   | 2.880      |
| 3RD  |    | ●  | ●   |     |     | ●   | 1.994      |
| 4TH  |    | ●  |     |     |     | ●   | 1.680      |
| 5TH  |    | ●  | ●   |     | ●   |     | 1.429      |
| 6TH  |    | ●  | ●   | ●   | ●   |     | 1.255      |
| 7TH  |    |    | ●   | ●   |     |     | 1.000      |
| 8TH  | ●  |    | ●   | ●   | ●   |     | 0.832      |
| 9TH  | ●  |    | ●   |     |     |     | 0.692      |
| 10TH | ●  |    |     | ●   | ●   |     | 0.600      |
| REV  | ●  | ●  |     | ●   | ●   |     | 4.644      |

MULTI-STAGE TRANSMISSION FOR VEHICLE

CROSS-REFERENCE TO RELATED APPLICATION

This application claims the priority benefit of Korean Patent Application No. 10-2017-0088406, filed on Jul. 12, 2017, the disclosure of which is incorporated herein by reference.

BACKGROUND

1. Field of the Invention

The present invention relates to a multi-stage transmission for a vehicle, and more particularly to a multi-stage transmission for a vehicle, which is capable of realizing an increased number of shifting stages using a minimal number of parts and a simplified configuration, thereby improving the fuel efficiency of a vehicle.

2. Description of the Related Art

Recently, rising oil prices have driven vehicle manufacturers worldwide into unbridled competition to improve fuel efficiency. In addition, efforts have been made to reduce the weight and improve the fuel efficiency of engines based on a variety of techniques such as downsizing.

Meanwhile, a method of the related art applied to vehicle transmissions includes allowing an engine to operate at more efficient operation points using the multi-staging of a transmission, thereby ultimately improving fuel efficiency. Further, such multi-staging of a transmission allows an engine to be operated in a relatively low revolution-per-minute (RPM) range, thereby further reducing the noise of a vehicle.

However, as the number of shifting stages of a transmission increases, the number of internal parts constituting the transmission also increases. This increase in component parts may lead to undesirable effects instead, such as reduced mountability and transfer efficiency and increased cost and weight of the transmission. Therefore, to maximize the effect of the improved fuel efficiency using the multi-staging of a transmission, it is important to devise a transmission structure that is able to realize maximum efficiency using a minimal number of parts and a relatively simple configuration.

The information disclosed in this of the invention section is merely for enhancement of understanding of the general background of the invention and should not be taken as an acknowledgement or any form of suggestion that this information forms the prior art already known to a person skilled in the art.

SUMMARY

Therefore, the present invention provides a multi-stage transmission for a vehicle, which is capable of realizing ten forward shifting stages and one reverse shifting stage with a reduced number of parts and a simplified configuration, whereby an engine may be operated at optimum operation points, leading to the maximally improved fuel efficiency of a vehicle, and whereby the engine may be operated more quietly, leading to the reduced noise of the vehicle.

In accordance with an aspect of the present invention, the above and other objects can be accomplished by the provision of a multi-stage transmission for a vehicle, that may include an input shaft, an output shaft, first, second, third, fourth and fifth planetary gear devices disposed between the input shaft and the output shaft to transmit rotary force, each of the first, second, third, fourth and fifth planetary gear devices having three rotary elements, respectively, and six shifting elements connected to the rotary elements of the first, second, third, fourth and fifth planetary gear devices.

A first rotary element of the first planetary gear device may be continuously connected to (e.g., fixed to) a first rotary element of the second planetary gear device and may be mounted to be selectively fixed to a transmission case by one of the shifting elements. A second rotary element of the first planetary gear device may be continuously connected to a third rotary element of the fifth planetary gear device, and a third rotary element of the first planetary gear device may be mounted to be selectively fixed to the transmission case by another one of the shifting elements.

Additionally, a second rotary element of the second planetary gear device may be continuously connected to the input shaft and may be selectively connected to a first rotary element of the fifth planetary gear device, and a third rotary element of the second planetary gear device may be selectively connected to a first rotary element of the third planetary gear device, a second rotary element of the third planetary gear device and a first rotary element of the fourth planetary gear device. The second rotary element of the third planetary gear device may be continuously connected to a third rotary element of the fourth planetary gear device, and a third rotary element of the third planetary gear device may be continuously connected to a second rotary element of the fourth planetary gear device. The first rotary element of the fourth planetary gear device may be continuously connected to the first rotary element of the fifth planetary gear device, and the second rotary element of the fourth planetary gear device may be continuously connected to a second rotary element of the fifth planetary gear device and the output shaft.

The first planetary gear device, the second planetary gear device, the third planetary gear device, the fourth planetary gear device and the fifth planetary gear device may be sequentially arranged in the axial direction oriented from the input shaft to the output shaft. The first rotary element of the first planetary gear device may be mounted to be selectively fixed to the transmission case by a first brake among the shifting elements, and the third rotary element of the first planetary gear device may be mounted to be selectively fixed to the transmission case by a second brake among the shifting elements.

The second rotary element of the second planetary gear device and the first rotary element of the fifth planetary gear device may be selectively connected to each other by a first clutch among the shifting elements, the third rotary element of the second planetary gear device. The first rotary element of the third planetary gear device may be selectively connected to each other by a second clutch among the shifting elements, the third rotary element of the second planetary gear device and the second rotary element of the third planetary gear device may be selectively connected to each other by a third clutch among the shifting elements. The third rotary element of the second planetary gear device and the first rotary element of the fourth planetary gear device may be selectively connected to each other by a fourth clutch among the shifting elements.

In accordance with another aspect of the present invention, a multi-stage transmission for a vehicle may include first, second, third, fourth and fifth planetary gear devices, each having three rotary elements, six shifting elements configured to selectively provide frictional force, and first, second, third, fourth, fifth, sixth, seventh, eighth and ninth rotary shafts connected to the rotary elements of the first, second, third, fourth and fifth planetary gear devices. The first rotary shaft is an input shaft directly connected to a second rotary element of the second planetary gear device, the second rotary shaft may be directly connected to a first rotary element of the first planetary gear device and a first rotary element of the second planetary gear device, and the third rotary shaft may be directly connected to a second rotary element of the first planetary gear device and a third rotary element of the fifth planetary gear device.

Additionally, the fourth rotary shaft may be directly connected to a third rotary element of the first planetary gear device, the fifth rotary shaft may be directly connected to a third rotary element of the second planetary gear device, the sixth rotary shaft may be directly connected to a first rotary element of the third planetary gear device, the seventh rotary shaft may be directly connected to a second rotary element of the third planetary gear device and a third rotary element of the fourth planetary gear device, and the eighth rotary shaft may be directly connected to a first rotary element of the fourth planetary gear device and a first rotary element of the fifth planetary gear device. The ninth rotary shaft is an output shaft directly connected to a third rotary element of the third planetary gear device, a second rotary element of the fourth planetary gear device and a second rotary element of the fifth planetary gear device.

The six shifting elements may include a first brake disposed between the second rotary shaft and a transmission case, a second brake disposed between the fourth rotary shaft and the transmission case, a first clutch disposed between the first rotary shaft and the eighth rotary shaft, a second clutch disposed between the fifth rotary shaft and the sixth rotary shaft, a third clutch disposed between the fifth rotary shaft and the seventh rotary shaft, and a fourth clutch disposed between the fifth rotary shaft and the eighth rotary shaft.

In accordance with a further aspect of the present invention, a multi-stage transmission for a vehicle may include an input shaft, an output shaft, first, second and third planetary gear devices disposed between the input shaft and the output shaft to transmit rotary force, each of the first, second and third planetary gear devices having three rotary elements, a compound planetary gear device having four rotary elements connected to the rotary elements of the first, second and third planetary gear devices, and six shifting elements connected to the rotary elements of the first, second and third planetary gear devices and the rotary elements of the compound planetary gear device.

A first rotary element of the first planetary gear device may be continuously connected to a first rotary element of the second planetary gear device and may be mounted to be selectively fixed to a transmission case by one of the shifting elements, a second rotary element of the first planetary gear device may be continuously connected to a fourth rotary element of the compound planetary gear device, and a third rotary element of the first planetary gear device may be mounted to be selectively fixed to the transmission case by another one of the shifting elements.

A second rotary element of the second planetary gear device may be continuously connected to the input shaft and may be selectively connected to a first rotary element of the compound planetary gear device, and a third rotary element of the second planetary gear device may be selectively connected to a first rotary element of the third planetary gear device, a second rotary element of the third planetary gear device and the first rotary element of the compound planetary gear device. The second rotary element of the third planetary gear device may be continuously connected to a third rotary element of the compound planetary gear device, and a third rotary element of the third planetary gear device may be continuously connected to a second rotary element of the compound planetary gear device and the output shaft.

The first planetary gear device, the second planetary gear device, the third planetary gear device and the compound planetary gear device may be sequentially arranged in the axial direction oriented from the input shaft to the output shaft. The first rotary element of the first planetary gear device may be mounted to be selectively fixed to the transmission case by a first brake among the shifting elements, and the third rotary element of the first planetary gear device may be mounted to be selectively fixed to the transmission case by a second brake among the shifting elements.

The second rotary element of the second planetary gear device and the first rotary element of the compound planetary gear device may be selectively connected to each other by a first clutch among the shifting elements, the third rotary element of the second planetary gear device and the first rotary element of the third planetary gear device may be selectively connected to each other by a second clutch among the shifting elements, the third rotary element of the second planetary gear device and the second rotary element of the third planetary gear device may be selectively connected to each other by a third clutch among the shifting elements, and the third rotary element of the second planetary gear device and the first rotary element of the compound planetary gear device may be selectively connected to each other by a fourth clutch among the shifting elements.

BRIEF DESCRIPTION OF THE DRAWINGS

The above and other objects, features and other advantages of the present invention will be more clearly understood from the following detailed description taken in conjunction with the accompanying drawings, in which:

FIG. 2 is an operation mode table for explaining the operation modes of the transmission shown in FIG. 1 according to one exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
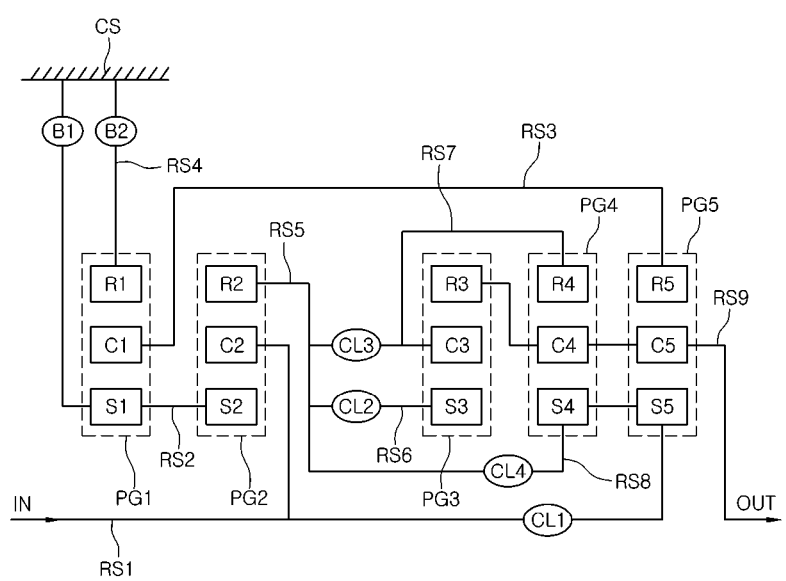
FIG. 1 is a view illustrating the configuration of a multi-stage transmission for a vehicle according to one exemplary embodiment of the present invention.

Referring to FIGS. 1 and 2, the multi-stage transmission for a vehicle according to one exemplary embodiment of the present invention may include an input shaft IN, an output shaft OUT, first to fifth planetary gear devices PG1, PG2, PG3, PG4 and PG5, each having three rotary elements, respectively, disposed between the input shaft IN and the output shaft OUT to transmit rotary force, and six shifting elements connected to the rotary elements of the first to fifth planetary gear devices PG1 to PG5.

A first rotary element S1 of the first planetary gear device PG1 may be continuously connected to (e.g., fixedly connected to) a first rotary element S2 of the second planetary gear device PG2 and may be mounted to be selectively fixed to (e.g., selectively connected to) a transmission case CS by one of the shifting elements. A second rotary element C1 of the first planetary gear device PG1 may be continuously connected to a third rotary element R5 of the fifth planetary gear device PG5. A third rotary element R1 of the first planetary gear device PG1 may be mounted to be selectively fixed to the transmission case CS by another one of the shifting elements.

A second rotary element C2 of the second planetary gear device PG2 may be continuously connected to the input shaft IN and may be selectively connected to a first rotary element S5 of the fifth planetary gear device PG5. A third rotary element R2 of the second planetary gear device PG2 may be selectively connected to a first rotary element S3 of the third planetary gear device PG3, a second rotary element C3 of the third planetary gear device PG3, and a first rotary element S4 of the fourth planetary gear device PG4. The second rotary element C3 of the third planetary gear device PG3 may be continuously connected to a third rotary element R4 of the fourth planetary gear device PG4. A third rotary element R3 of the third planetary gear device PG3 may be continuously connected to a second rotary element C4 of the fourth planetary gear device PG4.

The first rotary element S4 of the fourth planetary gear device PG4 may be continuously connected to the first rotary element S5 of the fifth planetary gear device PG5. The second rotary element C4 of the fourth planetary gear device PG4 may be continuously connected to a second rotary element C5 of the fifth planetary gear device PG5 and the output shaft OUT. The first planetary gear device PG1, the second planetary gear device PG2, the third planetary gear device PG3, the fourth planetary gear device PG4 and the fifth planetary gear device PG5 may be sequentially arranged in the axial direction oriented from the input shaft IN to the output shaft OUT.

The first rotary element S1 of the first planetary gear device PG1 may be mounted to be selectively fixed to the transmission case CS by a first brake B1 among the shifting elements. The third rotary element R1 of the first planetary gear device PG1 may be mounted to be selectively fixed to the transmission case CS by a second brake B2 among the shifting elements. Therefore, when the first brake B1 is operated, the rotation of the first rotary element S1 of the first planetary gear device PG1 is prevented. When the second brake B2 is operated, the rotation of the third rotary element R1 of the first planetary gear device PG1 is prevented.

The remaining elements among the shifting elements form variable connection structures that selectively connect the rotary elements of the planetary gear devices. In other words, among the shifting elements, a first clutch CL1 may selectively connect the second rotary element C2 of the second planetary gear device PG2 and the first rotary element S5 of the fifth planetary gear device PG5. A second clutch CL2 may selectively connect the third rotary element R2 of the second planetary gear device PG2 and the first rotary element S3 of the third planetary gear device PG3. A third clutch CL3 may selectively connect the third rotary element R2 of the second planetary gear device PG2 and the second rotary element C3 of the third planetary gear device PG3. A fourth clutch CL4 may selectively connect the third rotary element R2 of the second planetary gear device PG2 and the first rotary element S4 of the fourth planetary gear device PG4.

To prevent shift shocks, the shifting elements may be configured to be engaged to completely restrain relative rotation of the rotary elements connected to one another, to be released to completely permit relative rotation, or to be gradually changed from the engaged state for completely restraining relative rotation to the released state for completely permitting relative rotation by adjusting the magnitude of frictional force.

In this exemplary embodiment, the first rotary element S1, the second rotary element C1 and the third rotary element R1 of the first planetary gear device PG1 may be a first sun gear, a first carrier and a first ring gear, respectively. The first rotary element S2, the second rotary element C2 and the third rotary element R2 of the second planetary gear device PG2 may be a second sun gear, a second carrier and a second ring gear, respectively. The first rotary element S3, the second rotary element C3 and the third rotary element R3 of the third planetary gear device PG3 may be a third sun gear, a third carrier and a third ring gear, respectively. The first rotary element S4, the second rotary element C4 and the third rotary element R4 of the fourth planetary gear device PG4 may be a fourth sun gear, a fourth carrier and a fourth ring gear, respectively. The first rotary element S5, the second rotary element C5 and the third rotary element R5 of the fifth planetary gear device PG5 may be a fifth sun gear, a fifth carrier and a fifth ring gear, respectively.

The multi-stage transmission for a vehicle according to the exemplary embodiment configured as above may also be presented as follows. The multi-stage transmission for a vehicle may include the first to fifth planetary gear devices PG1 to PG5, each having the three rotary elements, and the at least six shifting elements configured to selectively provide frictional force, and further may include nine rotary shafts connected to the rotary elements of the planetary gear devices.

In particular, among the nine rotary shafts, a first rotary shaft RS1 may be the input shaft IN directly connected to the second rotary element C2 of the second planetary gear device PG2. A second rotary shaft RS2 may be directly connected to the first rotary element S1 of the first planetary gear device PG1 and the first rotary element S2 of the second planetary gear device PG2. A third rotary shaft RS3 may be directly connected to the second rotary element C1 of the first planetary gear device PG1 and the third rotary element R5 of the fifth planetary gear device PG5.

Further, a fourth rotary shaft RS4 may be directly connected to the third rotary element R1 of the first planetary gear device PG1. A fifth rotary shaft RS5 may be directly connected to the third rotary element R2 of the second planetary gear device PG2. A sixth rotary shaft RS6 may be directly connected to the first rotary element S3 of the third planetary gear device PG3. A seventh rotary shaft RS7 may be directly connected to the second rotary element C3 of the third planetary gear device PG3 and the third rotary element R4 of the fourth planetary gear device PG4. An eighth rotary shaft RS8 may be directly connected to the first rotary element S4 of the fourth planetary gear device PG4 and the first rotary element S5 of the fifth planetary gear device PG5. A ninth rotary shaft RS9 may be the output shaft OUT directly connected to the third rotary element R3 of the third planetary gear device PG3, the second rotary element C4 of the fourth planetary gear device PG4 and the second rotary element C5 of the fifth planetary gear device PG5.

In addition, among the six shifting elements, the first brake B1 may be disposed between the second rotary shaft RS2 and the transmission case CS. The second brake B2 may be disposed between the fourth rotary shaft RS4 and the transmission case CS. The first clutch CL1 may be disposed between the first rotary shaft RS1 and the eighth rotary shaft RS8. The second clutch CL2 may be disposed between the fifth rotary shaft RS5 and the sixth rotary shaft RS6. The third clutch CL3 may be disposed between the fifth rotary shaft RS5 and the seventh rotary shaft RS7. The fourth clutch CL4 may be disposed between the fifth rotary shaft RS5 and the eighth rotary shaft RS8.

Figure 3:
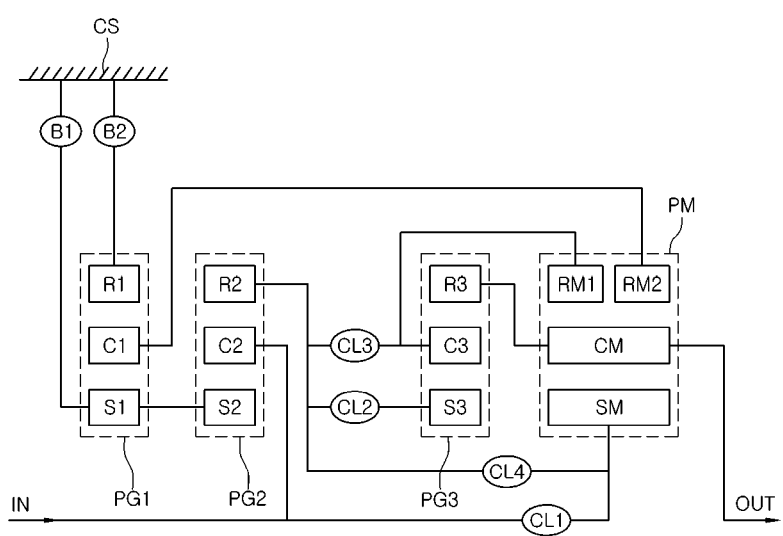
FIG. 3 is a view illustrating a multi-stage transmission for a vehicle according to another exemplary embodiment of the present invention.

FIG. 3 is a view illustrating a multi-stage transmission for a vehicle according to another exemplary embodiment of the present invention, which may include an input shaft IN, an output shaft OUT, first to third planetary gear devices PG1 to PG3, each having three rotary elements, disposed between the input shaft IN and the output shaft OUT to transmit rotary force, a compound planetary gear device PM having four rotary elements connected to the rotary elements of the first to third planetary gear devices PG1 to PG3, and at least six shifting elements connected to the rotary elements of the first to third planetary gear devices PG1 to PG3 and the rotary elements of the compound planetary gear device PM.

A first rotary element S1 of the first planetary gear device PG1 may be continuously connected to (e.g., fixedly connected to) a first rotary element S2 of the second planetary gear device PG2 and may be mounted to be selectively fixed to (e.g., selectively connected to) a transmission case CS by one of the shifting elements (e.g., a first of the shifting elements). A second rotary element C1 of the first planetary gear device PG1 may be continuously connected to a fourth rotary element RM2 of the compound planetary gear device PM. A third rotary element R1 of the first planetary gear device PG1 may be mounted to be selectively fixed to the transmission case CS by another one of the shifting elements (e.g., a second of the shifting elements).

A second rotary element C2 of the second planetary gear device PG2 may be continuously connected to the input shaft IN and may be selectively connected to a first rotary element SM of the compound planetary gear device PM. A third rotary element R2 of the second planetary gear device PG2 may be selectively connected to a first rotary element S3 of the third planetary gear device PG3, a second rotary element C3 of the third planetary gear device PG3 and the first rotary element SM of the compound planetary gear device PM.

The second rotary element C3 of the third planetary gear device PG3 may be continuously connected to a third rotary element RM1 of the compound planetary gear device PM. A third rotary element R3 of the third planetary gear device PG3 may be continuously connected to a second rotary element CM of the compound planetary gear device PM and the output shaft OUT. The first planetary gear device PG1, the second planetary gear device PG2, the third planetary gear device PG3, and the compound planetary gear device PM may be sequentially arranged in the axial direction oriented from the input shaft IN to the output shaft OUT. The first rotary element S1 of the first planetary gear device PG1 may be mounted to be selectively fixed to the transmission case CS by a first brake B1 among the shifting elements. The third rotary element R1 of the first planetary gear device PG1 may be mounted to be selectively fixed to the transmission case CS by a second brake B2 among the shifting elements.

In addition, among the shifting elements, a first clutch CL1 may selectively connect the second rotary element C2 of the second planetary gear device PG2 and the first rotary element SM of the compound planetary gear device PM. A second clutch CL2 may selectively connect the third rotary element R2 of the second planetary gear device PG2 and the first rotary element S3 of the third planetary gear device PG3. A third clutch CL3 may selectively connect the third rotary element R2 of the second planetary gear device PG2 and the second rotary element C3 of the third planetary gear device PG3. A fourth clutch CL4 may selectively connect the third rotary element R2 of the second planetary gear device PG2 and the first rotary element SM of the compound planetary gear device PM.

In other words, the exemplary embodiment shown in FIG. 3 is substantially the same as the exemplary embodiment shown in FIG. 1, excluding the configuration in which the fourth planetary gear device PG4 and the fifth planetary gear device PG5 in FIG. 1 are replaced by a single compound planetary gear device PM. In particular, the compound planetary gear device PM in FIG. 3 is configured such that the fourth sun gear S4 of the fourth planetary gear device PG4 and the fifth sun gear S5 of the fifth planetary gear device PG5 in FIG. 1 are combined and the fourth carrier C4 of the fourth planetary gear device PG4 and the fifth carrier C5 of the fifth planetary gear device PG5 in FIG. 1 are combined.

Therefore, both the multi-stage transmission according to the exemplary embodiment in FIG. 1 and the multi-stage transmission according to the exemplary embodiment in FIG. 3 are identically operated according to the operation mode table of FIG. 2, and accordingly realize ten forward shifting stages and one reverse shifting stage. In particular, FIG. 2 illustrates the specific gear ratios of the two brakes and the clutches of the transmission in the various ten forward shifting stages and the one reverse shifting stage, based on which are engaged.

As described above, since the multi-stage shifting stages of ten shifting stages may be accomplished with a reduced number of parts and a simplified configuration, the multi-stage transmission for a vehicle according to the present invention may contribute to the improved fuel efficiency and quietness of a vehicle, thereby ultimately improving the marketability of the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-stage transmission for a vehicle, comprising:
   an input shaft;
   an output shaft;
   first, second, third, fourth and fifth planetary gear devices disposed between the input shaft and the output shaft to transmit rotary force, each of the first, second, third, fourth and fifth planetary gear devices having three rotary elements, respectively; and
   at least six shifting elements connected to the rotary elements of the first, second, third, fourth and fifth planetary gear devices,
   wherein a first rotary element of the first planetary gear device is continuously connected to a first rotary element of the second planetary gear device and is mounted to be selectively fixed to a transmission case by one of the shifting elements, a second rotary element of the first planetary gear device is continuously connected to a third rotary element of the fifth planetary gear device, and a third rotary element of the first planetary gear device is mounted to be selectively fixed to the transmission case by another one of the shifting elements,
   wherein a second rotary element of the second planetary gear device is continuously connected to the input shaft and is selectively connected to a first rotary element of the fifth planetary gear device, and a third rotary element of the second planetary gear device is selectively connected to a first rotary element of the third planetary gear device, a second rotary element of the third planetary gear device and a first rotary element of the fourth planetary gear device,
   wherein the second rotary element of the third planetary gear device is continuously connected to a third rotary element of the fourth planetary gear device, and a third rotary element of the third planetary gear device is continuously connected to a second rotary element of the fourth planetary gear device, and
   wherein the first rotary element of the fourth planetary gear device is continuously connected to the first rotary element of the fifth planetary gear device, and the second rotary element of the fourth planetary gear device is continuously connected to a second rotary element of the fifth planetary gear device and the output shaft.

2. The multi-stage transmission according to claim 1, wherein the first planetary gear device, the second planetary gear device, the third planetary gear device, the fourth planetary gear device and the fifth planetary gear device are sequentially arranged in an axial direction oriented from the input shaft to the output shaft.

3. The multi-stage transmission according to claim 2, wherein the first rotary element of the first planetary gear device is mounted to be selectively fixed to the transmission case by a first brake among the shifting elements, and the third rotary element of the first planetary gear device is mounted to be selectively fixed to the transmission case by a second brake among the shifting elements.

4. The multi-stage transmission according to claim 3, wherein:
   the second rotary element of the second planetary gear device and the first rotary element of the fifth planetary gear device are selectively connected to each other by a first clutch among the shifting elements;
   the third rotary element of the second planetary gear device and the first rotary element of the third planetary gear device are selectively connected to each other by a second clutch among the shifting elements;
   the third rotary element of the second planetary gear device and the second rotary element of the third planetary gear device are selectively connected to each other by a third clutch among the shifting elements; and
   the third rotary element of the second planetary gear device and the first rotary element of the fourth planetary gear device are selectively connected to each other by a fourth clutch among the shifting elements.

5. A multi-stage transmission for a vehicle, comprising:
   first, second, third, fourth and fifth planetary gear devices, each having three rotary elements;
   six shifting elements configured to selectively provide frictional force; and
   first, second, third, fourth, fifth, sixth, seventh, eighth and ninth rotary shafts connected to the rotary elements of the first, second, third, fourth and fifth planetary gear devices,
   wherein the first rotary shaft is an input shaft directly connected to a second rotary element of the second planetary gear device, the second rotary shaft is directly connected to a first rotary element of the first planetary gear device and a first rotary element of the second planetary gear device, the third rotary shaft is directly connected to a second rotary element of the first planetary gear device and a third rotary element of the fifth planetary gear device, the fourth rotary shaft is directly connected to a third rotary element of the first planetary gear device, the fifth rotary shaft is directly connected to a third rotary element of the second planetary gear device, the sixth rotary shaft is directly connected to a first rotary element of the third planetary gear device, the seventh rotary shaft is directly connected to a second rotary element of the third planetary gear device and a third rotary element of the fourth planetary gear device, the eighth rotary shaft is directly connected to a first rotary element of the fourth planetary gear device and a first rotary element of the fifth planetary gear device, and the ninth rotary shaft is an output shaft directly connected to a third rotary element of the third planetary gear device, a second rotary element of the fourth planetary gear device and a second rotary element of the fifth planetary gear device.

6. The multi-stage transmission according to claim 5, wherein the six shifting elements include:
   a first brake disposed between the second rotary shaft and a transmission case;
   a second brake disposed between the fourth rotary shaft and the transmission case;
   a first clutch disposed between the first rotary shaft and the eighth rotary shaft;
   a second clutch disposed between the fifth rotary shaft and the sixth rotary shaft;

a third clutch disposed between the fifth rotary shaft and the seventh rotary shaft; and a fourth clutch disposed between the fifth rotary shaft and the eighth rotary shaft.

7. A multi-stage transmission for a vehicle, comprising:
an input shaft;
an output shaft;
first, second and third planetary gear devices disposed between the input shaft and the output shaft to transmit rotary force, each of the first, second and third planetary gear devices having three rotary elements;
a compound planetary gear device having four rotary elements connected to the rotary elements of the first, second and third planetary gear devices; and
six shifting elements connected to the rotary elements of the first, second and third planetary gear devices and the rotary elements of the compound planetary gear device,
wherein a first rotary element of the first planetary gear device is continuously connected to a first rotary element of the second planetary gear device and is mounted so as to be selectively fixed to a transmission case by one of the shifting elements, a second rotary element of the first planetary gear device is continuously connected to a fourth rotary element of the compound planetary gear device, and a third rotary element of the first planetary gear device is mounted to be selectively fixed to the transmission case by another one of the shifting elements,
wherein a second rotary element of the second planetary gear device is continuously connected to the input shaft and is selectively connected to a first rotary element of the compound planetary gear device, and a third rotary element of the second planetary gear device is selectively connected to a first rotary element of the third planetary gear device, a second rotary element of the third planetary gear device and the first rotary element of the compound planetary gear device, and wherein the second rotary element of the third planetary gear device is continuously connected to a third rotary element of the compound planetary gear device, and a third rotary element of the third planetary gear device is continuously connected to a second rotary element of the compound planetary gear device and the output shaft.

8. The multi-stage transmission according to claim 7, wherein the first planetary gear device, the second planetary gear device, the third planetary gear device and the compound planetary gear device are sequentially arranged in an axial direction oriented from the input shaft to the output shaft.

9. The multi-stage transmission according to claim 8, wherein the first rotary element of the first planetary gear device is mounted to be selectively fixed to the transmission case by a first brake among the shifting elements, and the third rotary element of the first planetary gear device is mounted to be selectively fixed to the transmission case by a second brake among the shifting elements.

10. The multi-stage transmission according to claim 9, wherein:
the second rotary element of the second planetary gear device and the first rotary element of the compound planetary gear device are selectively connected to each other by a first clutch among the shifting elements,
the third rotary element of the second planetary gear device and the first rotary element of the third planetary gear device are selectively connected to each other by a second clutch among the shifting elements,
the third rotary element of the second planetary gear device and the second rotary element of the third planetary gear device are selectively connected to each other by a third clutch among the shifting elements, and
the third rotary element of the second planetary gear device and the first rotary element of the compound planetary gear device are selectively connected to each other by a fourth clutch among the shifting elements.

* * * * *